US011257282B2

(12) United States Patent
Tong et al.

(10) Patent No.: US 11,257,282 B2
(45) Date of Patent: Feb. 22, 2022

(54) METHODS AND APPARATUS TO DETECT COLLISION OF A VIRTUAL CAMERA WITH OBJECTS IN THREE-DIMENSIONAL VOLUMETRIC MODEL (71) Applicant: Intel Corporation, Santa Clara, CA (US)

(72) Inventors: Xiaofeng Tong, Beijing (CN); Qiang Li, Beijing (CN); Wenlong Li, Beijing (CN); Yikai Fang, Beijing (CN); Ofer Shkedi, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/054,078

(22) PCT Filed: Dec. 24, 2018

(86) PCT No.: PCT/CN2018/123029
§ 371 (c)(1),
(2) Date: Nov. 9, 2020

(87) PCT Pub. No.: WO2020/132784
PCT Pub. Date: Jul. 2, 2020

(65) Prior Publication Data
US 2021/0241518 A1 Aug. 5, 2021

(51) Int. Cl.
*G06T 15/20* (2011.01)
*G06T 17/00* (2006.01)
(52) U.S. Cl.
CPC .............. *G06T 15/20* (2013.01); *G06T 17/00* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| 2017/0318283 | A1 | 11/2017 | Watson et al. | |
| 2018/0203509 | A1* | 7/2018 | Yamano | A63F 13/285 |
| 2019/0083885 | A1* | 3/2019 | Yee | G06T 15/20 |
| 2019/0374855 | A1* | 12/2019 | Johnston | H04N 13/254 |

FOREIGN PATENT DOCUMENTS

| GN | 101251925 | 8/2008 |
| GN | 101931790 | 12/2010 |
| GN | 103402106 | 11/2013 |

OTHER PUBLICATIONS

International Searching Authority, "International Search Report and Written Opinion," issued in connection with PCT patent application No. PCT/CN2018/123029, dated Sep. 6, 2019, 9 pages.

* cited by examiner

*Primary Examiner* — Frank S Chen
(74) *Attorney, Agent, or Firm* — Hanley, Flight & Zimmerman, LLC (57) ABSTRACT

Methods and apparatus to detect collision of a virtual camera with objects in a three-dimensional volumetric model are disclosed herein. An example virtual camera system disclosed herein includes cameras to obtain images of a scene in an environment. The example virtual camera system also includes a virtual camera generator to create a 3D volumetric model of the scene based on the images, identify a 3D location of a virtual camera to be disposed in the 3D volumetric model, and detect whether a collision occurs between the virtual camera and one or more objects in the 3D volumetric model.

21 Claims, 8 Drawing Sheets

METHODS AND APPARATUS TO DETECT COLLISION OF A VIRTUAL CAMERA WITH OBJECTS IN THREE-DIMENSIONAL VOLUMETRIC MODEL

FIELD OF THE DISCLOSURE

This disclosure relates generally to three-dimensional volumetric models and, more particularly, to methods and apparatus to detect collision of a virtual camera with objects in a three-dimensional volumetric model.

BACKGROUND

In recent years, three-dimensional (3D) modeling technology has been used to provide a more immersive experience for viewers of a sports game (e.g., a football game, a soccer game, etc.). Scenes from a sports game can be recreated in a 3D volumetric model, such as a point cloud or mesh, and viewed from different locations on the playing field where a camera is not actually located. This provides a whole new experience for viewers by enabling viewers to be closer to the action of the game.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Three-dimensional (3D) modeling technology is now being used in connection with sports games to create more immersive experiences for viewers. This technology enables the display of an event in a game from various locations and angles where a physical camera is not actually located.

Disclosed herein are example virtual camera systems that include example virtual camera generators that can generate a 3D volumetric model of one or more scenes of an environment, such as a sports game, and enable a viewer to viewer the scene(s) from various locations and/or angles. An example system disclosed herein includes plurality of cameras that are disposed around a sports arena (e.g., a soccer arena, a football arena, etc.) having a playing field. The cameras are directed at various locations of the playing field. The cameras are synchronized to obtain images at the same time. Each set of images from a particular time corresponds to a particular scene occurring on the playing field at that moment in time. The cameras may be synchronized to continually obtain images at a particular frequency (e.g., at 30 hertz (Hz)).

An example virtual camera generator disclosed herein receives the sets of images. The virtual camera generator creates a 3D volumetric model for each scene based on the set of images from that scene. A 3D volumetric model, such as a point cloud or mesh, includes a set of voxels (3D pixels) having 3D coordinates. The voxels form the surfaces that define the scene, such as the surfaces of the playing field, the players, any sports implements (e.g., balls, pucks, etc.), and/or any other object in the scene. Once a 3D volumetric model of a scene is created, the scene in the 3D volumetric model can be viewed from any position and/or angle, thereby enabling a viewer to view the scene from a location and/or angle where an actual, physical camera is not actually present. For example, once a 3D volumetric model of a scene is created, a user (sometimes referred to as director) may select to view the scene through a virtual camera positioned at a particular 3D location, such as few feet behind a player on the playing field. The virtual camera generator can generate an image corresponding to the view from the virtual camera of the scene, which gives the viewer the effect of being behind the player and viewing the action from the player's point-of-view. The user can control the location of the virtual camera to move to various other locations around the scene. This can provide an immersive and powerful experience for a viewer.

Additionally, a plurality of sequential scenes can be created and used to create a video segment having any length of time (e.g., 3 seconds, 5 seconds, etc.). The video can be rendered in real-time as an event is occurring or recorded and used for replay at a later time. A user can select a route for the virtual camera to move through the scenes as an event unfolds. For example, in a soccer game, it may be desired to place the virtual camera behind a player running toward a goal. The virtual camera may be a few feet off the ground and positioned 10 feet behind the player, for example. This placement of a physical camera is not practical. However, using 3D modeling, the virtual camera view provides an immersive and powerful experience for a viewer.

While it is often desired to place the virtual camera at a location that is close to the action, one or more objects (e.g., a player, a ball, a goal post, etc.) may collide with or become too close to the virtual camera in the 3D volumetric model. This results in a close-up view of the voxels in the 3D volumetric model, which is undesirable and disruptive to the viewing of the game. For example, the virtual camera may be tracking a player in real time during a play. While initially there may be no collision, one or more other players may collide with the virtual camera later in the play. The director has to then attempt to manually select a new location or route for the virtual camera to avoid collision.

Disclosed herein are example collision detectors that detect a possible collision of the virtual camera with one or more objects in a 3D volumetric model. As used herein, the term "collision" means an actual overlapping of a virtual camera in a 3D volumetric model with an object in the 3D volumetric model or close placement of the virtual camera in a 3D volumetric model with an object in the 3D volumetric model that may otherwise significantly obstruct the view from the virtual camera. In some examples, if a collision is detected, the virtual camera generator generates an alert so that a user can select a new 3D location for the virtual camera to view the scene. Additionally or alternatively, the example virtual camera generator can automatically select a new 3D location where no collision occurs, which reduces operational costs associated with selecting a location of the virtual camera and improves viewer experience by avoid collisions that result in close-ups of voxels of other players or objects.

While many of the examples disclosed here are described in connection with viewing a sports game, it is understood that the examples disclosed herein can be similarly used in connection with other types of events. For example, the examples disclosed herein can be used to create and view one or more scenes of a crowd at a concert, a battlefield, and/or any other activity where a person may desire to view a scene from a position that is not easily accessible with a physical camera.

Figure 1:
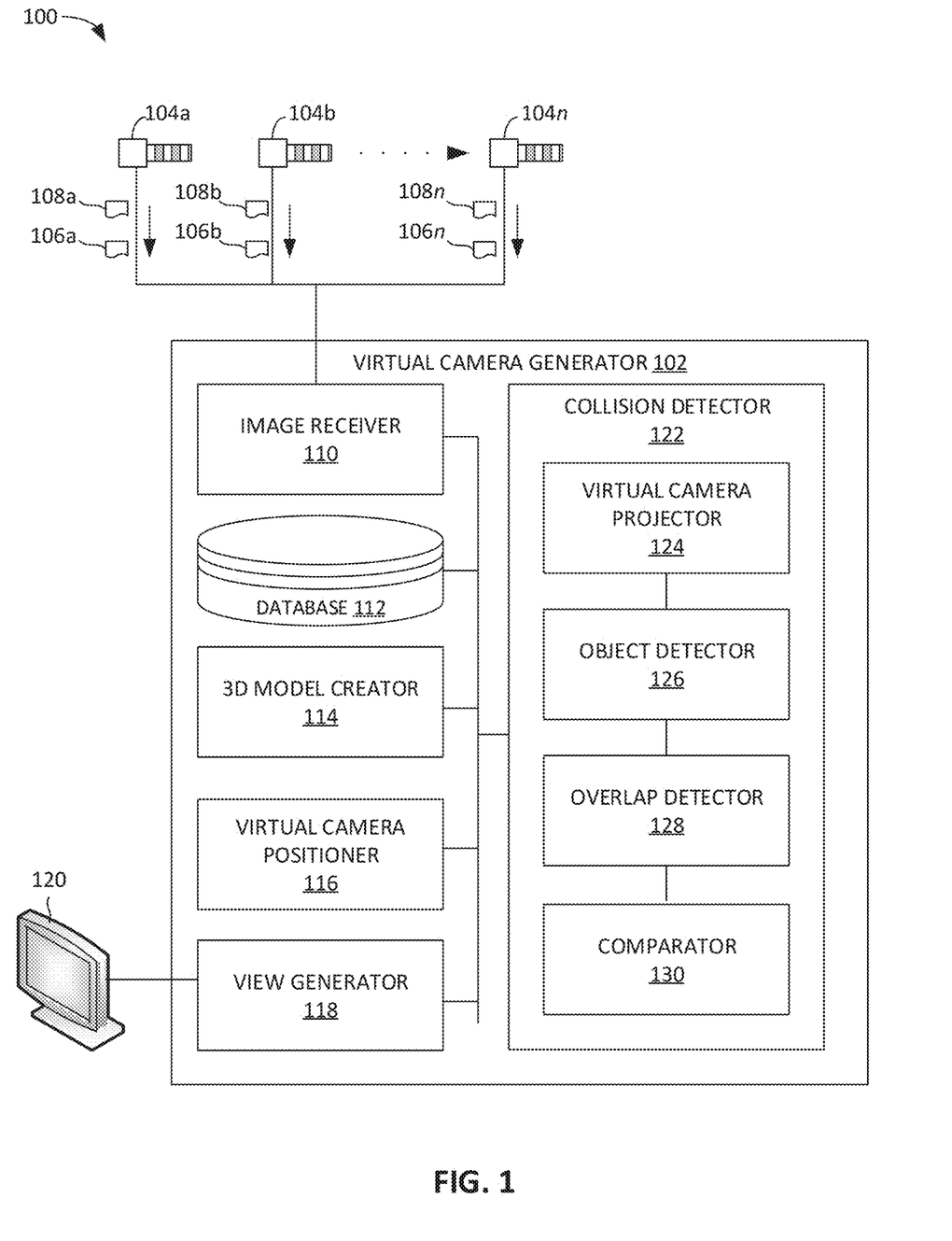
FIG. 1 is a block diagram of an example virtual camera system including an example virtual camera generator constructed in accordance with the teachings of this disclosure.
Figure 2:
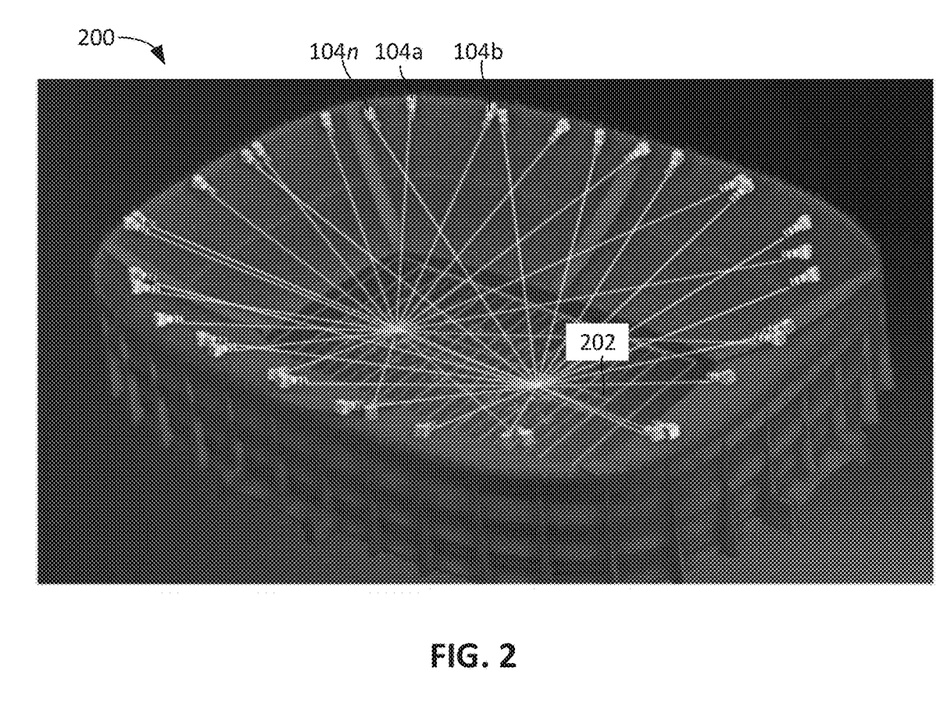
FIG. 2 illustrates an example sports arena with which the example virtual camera system of FIG. 1 can be implemented.

Turning now to the figures, FIG. 1 is a block diagram of an example virtual camera system 100 including an example virtual camera generator 102 that can be used to generate one or more images from a 3D virtual location. In the illustrated example, the virtual camera system 100 includes a set cameras 104a-104n. The cameras 104a-104n are to be disposed at various locations around an environment, such as a playing field of a sports arena where a sports game is occurring. For example, referring briefly to FIG. 2, the cameras 104a-104n (three of which are referenced in FIG. 2) are disposed around a football arena 200 having a playing field 202. In the illustrated example, 36 cameras are used. However, in other examples, more or fewer cameras may be used. The cameras 104a-104n may be, for example, high definition cameras (e.g., a 5120×3072 resolution camera). The cameras 104a-104n capture images during the scenes unfolding on the playing field 202. The cameras 104a-104n are oriented to face in various directions to capture different sections of the scenes. For instance, in the illustrated example of FIG. 2, some of the cameras 104a-104n are directed at first location on the playing field 202 and other ones of the cameras 104a-104n are directed at a second location on the playing field 202 different than the first location. In other examples, all of the cameras 104a-104n may be directed at the same location or the cameras 104a-104n may be directed at more than two locations. The views from some of the cameras 104a-104n may overlap while the views from other ones of the cameras 104a-104n may not overlap.

Referring back to FIG. 1, the cameras 104a-104n are synchronized to obtain images (which may be referred to as frames or reels) of the scenes of the environment at the same time. Each set of images taken at the same time is used to create a 3D volumetric model of the scene occurring at that corresponding moment in time, as disclosed in further detail herein. In some examples, the cameras 104a-104n continuously obtain images of the playing field at a particular frequency (e.g., at 30 Hz). For example, at a first time (t=0.00), a first set of images 106a-106n is obtained by the respective cameras 104a-104n. At a second time (t=0.03), a second set of images 108a-108n is obtained by the respective cameras 104a-104n. At a third time (t=0.06), a third set of images is obtained by the respective cameras 104a-104n, and so forth. Each set of images captures a particular scene occurring at that moment in time on the playing field. In some examples, the cameras 104a-104n continually obtain images through an entire game. In other examples, the virtual camera generator 102 may instruct the cameras 104a-104n to obtain images only during certain time periods (e.g., when a play clock is running, when an offensive team is close to scoring, etc.).

The images (e.g., the first set of images 106a-106n, the second set of images 108a-108n, etc.) from the cameras 104a-104n are received by an image receiver 110 of the virtual camera generator 102. The images may be transmitted via any wired or wireless connection (e.g., via a wireless Intent connection, via Bluetooth®, etc.). If the images are sent via a wireless connection, the image receiver 110 may include a transceiver. The image receiver 110 saves the images in a database 112. In some examples, the images are tagged with identifying information, such as the time the respective image was taken (e.g., a timestamp) and/or the identification of the camera that took the image. In some examples, the images are tagged with this information by the respective cameras 104a-104n. Additionally or alternatively, the image receiver 110 may tag the incoming images with the information.

In the illustrated example, the virtual camera generator 102 includes a 3D model creator 114. The 3D model creator 114 creates or generates a 3D volumetric model, such as a point cloud or mesh, for each scene based on the set of images from the respective scene. A 3D volumetric model of a scene includes a plurality of voxels, which are 3D pixels having X, Y, Z coordinates, that make up the surfaces of the various objects in the scene. Each voxel may also have an assigned color. The 3D locations and orientations of the cameras 104a-104n are known. The location and orientation information may be based on a global XYZ coordinate system established ahead of time. Using this information, the 3D model creator 114 uses segmentation and 3D reconstruction techniques to create the 3D volumetric model of a scene based on the images of that scene from the cameras 104a-104n.

For example, the 3D model creator 114 can create a 3D volumetric model of a first scene based on the first set of images 106a-106n. The 3D volumetric model of the first scene includes voxels that form the surfaces of the playing field, the players, the ball(s), and/or any other objects on the playing field within the field of view of the cameras 104a-104n during the moment in time the first set of images 106a-106n was taken. In some examples, the 3D model creator 114 can also construct objects outside of the playing field, such as the stadium and/or the crowd in the stadium.

The 3D model creator 114 saves the 3D volumetric model of the first scene in the database 112. Similarly, the 3D model creator 114 creates a 3D volumetric model for a second scene based on the second set of images 108a-108n, and so forth.

In the illustrated example, the virtual camera generator 102 includes a virtual camera positioner 116. The virtual camera positioner 116 identifies a candidate 3D location at which a virtual camera is to be disposed in the 3D volumetric model. The 3D candidate location represents the location from which it is desired to view the scene. For example, a candidate 3D location of the virtual camera may be five feet above the center of the 50 yard line on a football field.

In some examples, the candidate 3D location of the virtual camera is selected by a user, sometimes referred to as a director. For example, a user may input (e.g., via the display 120 or another input device (e.g., a mouse, a keyboard, etc.) associated with the display 120) that he/she wishes to view the scene from particular X, Y, Z coordinates. As such, the director can manually control the position and orientation of the virtual camera. In other examples, the virtual camera positioner 116 can automatically select a candidate 3D location for the virtual camera. For instance, in some examples, a user may desire to have the virtual camera follow a particular path through one scene or a plurality of scenes (e.g., creating a video segment). For example, a user may desire to have the virtual camera placed 10 feet behind a particular player at a height of 5 feet above the playing field. The virtual camera positioner 116 may implement a tracking algorithm that tracks the position of the player through the scenes and determines the corresponding 3D location for the virtual camera in each of the scenes. Example techniques that may be implemented by the virtual camera positioner 116 for selecting and/or identifying a candidate 3D location are disclosed in International Application No. PCT/CN2018/108375, titled "Automated Generation of Camera Paths," filed on Sep. 28, 2018, and International Application No. PCT/CN2018/107832, titled "Method and Apparatus of Identifying Freeze Moment for Volumetric Content Creation," filed on Sep. 27, 2018, both of which are hereby incorporated by reference in their entireties.

In the illustrated example, the virtual camera generator 102 includes a view generator 118 that generates the image(s) of a scene of a 3D volumetric model. In the illustrated example, the virtual camera system 100 includes a display 120 to view the generated image(s). The image(s) are based on the 3D location and orientation of the virtual camera in the 3D volumetric model of the scene. The view generator 118 can output one image, corresponding to one view from one scene, or multiple images in sequence, which may be perceived as a video segment.

Figure 3:
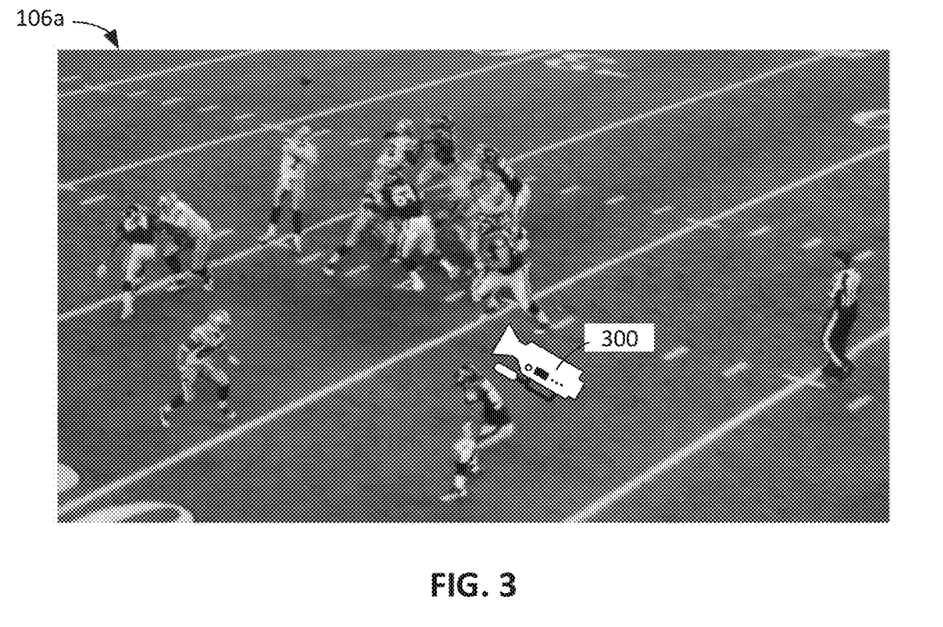
FIG. 3 is an example image of a scene taken by one of the cameras of the example virtual camera system of FIG. 1.
Figure 4:
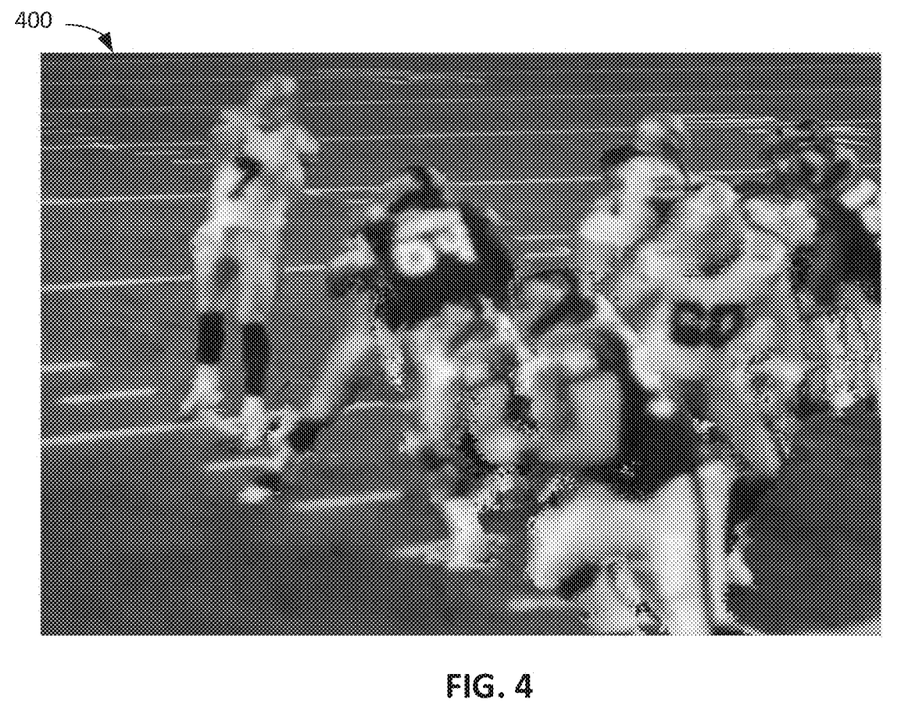
FIG. 4 is an example image from a three-dimensional (3D) volumetric model of the scene in FIG. 3 as generated by the example virtual camera generator of FIG. 1.

For example, FIG. 3 shows an example image, such as the first image 106a, taken by the camera 104a during a scene in a football game. The 3D model creator 114 creates a 3D volumetric model of the scene based on all of the images 106a-106n corresponding to that scene. Assume a virtual camera 300 is to be positioned in the location shown in FIG. 3 and orientated generally toward the quarterback. The view generator 118 creates an image that represents the view from the virtual camera 300 based on the 3D volumetric model for the scene and the location and orientation information for the virtual camera. FIG. 4 shows an example image 400 rendered by the view generator 118 from this position and orientation. The image 400 appears to have been taken from a camera that is on the playing field where a camera is not actually present. This enables a viewer to view the scene from a position that is closer to the action, which provides an immersive experience for a viewer.

Figure 5:
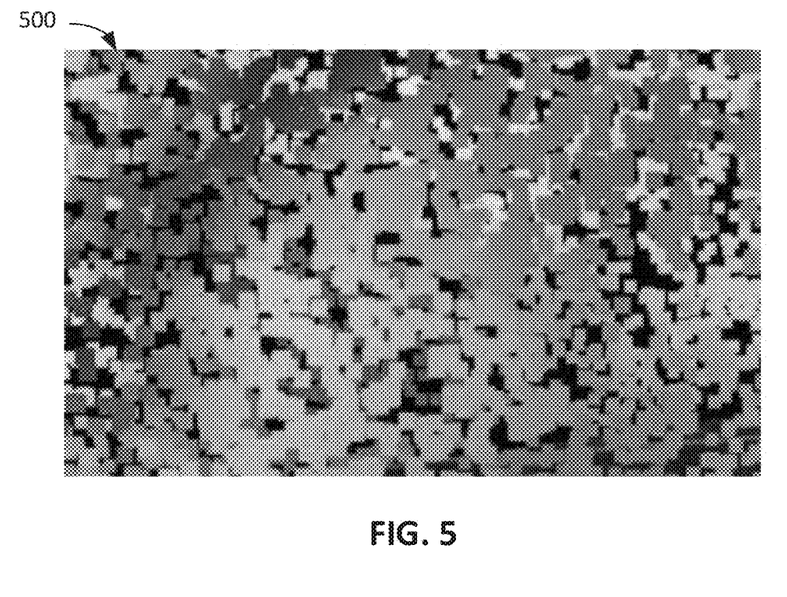
FIG. 5 is an image that may result from a collision of a virtual camera and an object in a scene of a 3D volumetric model.

However, as mentioned above, if the virtual camera collides with or otherwise becomes too close to an object (e.g., a player, a ball, etc.) in the 3D volumetric model for a scene, the view from the virtual camera results in a close-up view of a plurality of voxels, which is undesired. For example, FIG. 5 shows an example image 500 from a virtual camera that is too close to an object in the 3D volumetric model for a scene. While the 3D volumetric model is constructed of voxels of known locations that form the surfaces of objects in the scene, the 3D coordinates or boundaries of each object, such as a player or ball, are unknown. In other words, the boundaries of specific objects in the 3D volumetric model are not distinguishable.

Therefore, the example virtual camera generator 102 of FIG. 1 includes an example collision detector 122 to detect whether a collision may occur between a candidate 3D location of a virtual camera and one or more objects in a 3D volumetric model for a scene. If the collision detector 122 detects a collision, the virtual camera generator 102 may generate an alert and/or select a new 3D location for the virtual camera, as disclosed in further detail herein. The collision detector 122 performs a collision detection process, disclosed below, to detect whether a collision may occur.

In the illustrated example, the collision detector 122 includes a virtual camera projector 124. The virtual camera projector 124 projects the virtual camera into each of the images of a scene, such as the first set of images 106a-106n. For instance, because the 3D location and orientation of each of the cameras 104a-104n is known, and the 3D location and size of the virtual camera is known, the virtual camera projector 124 can project an object (e.g., a 3D object) representing the virtual camera into each of the images 106a-106n in which the virtual camera would be viewable. In some examples, the virtual camera projector 124 uses a series of triangulation computations or a forward projection matrix to project the virtual camera into the images. The virtual camera may be represented by any sized or shaped object. In some examples, the virtual camera is represented by an object have generally the same dimension as an actual camera, such as, for example, 1 foot by 6 inches by 6 inches.

Figure 6:
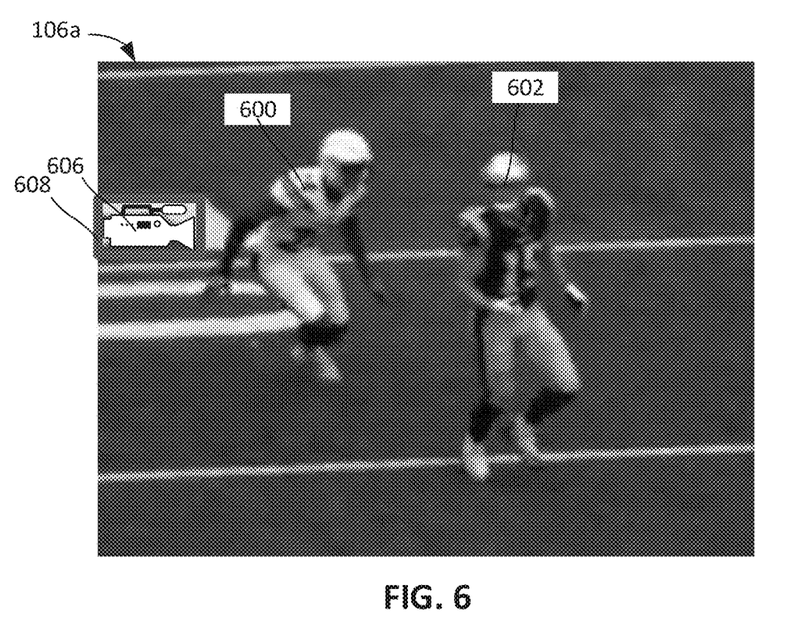
FIG. 6 is a first example image with an example virtual camera projected into the first example image by the example virtual camera generator of FIG. 1 during a collision detection process.
Figure 7:
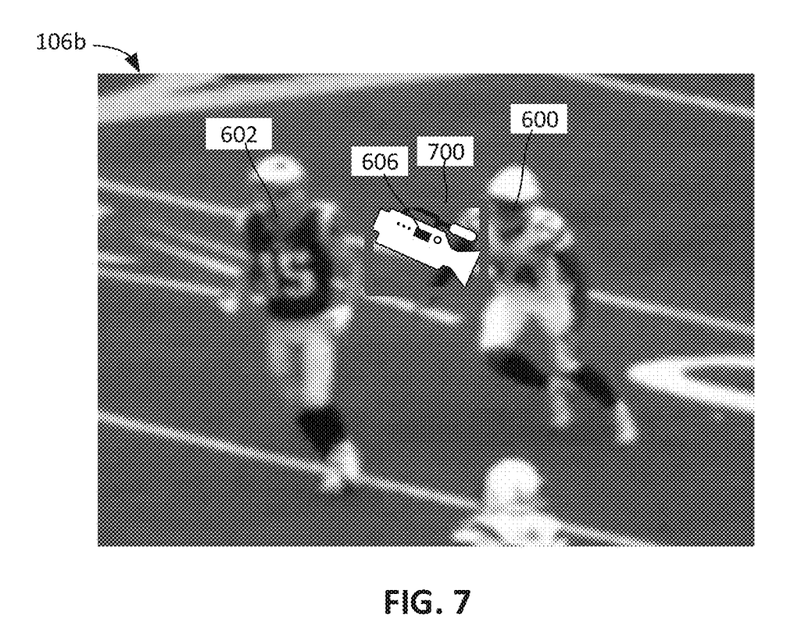
FIG. 7 is a second example image with the example virtual camera projected into the second example image by the example virtual camera generator of FIG. 1 during a collision detection process.

For example, FIG. 6 is an example image (or a portion of an image) taken from one of the cameras 104a-104n, and FIG. 7 is another example image (or a portion of an image) taken from a different one of the cameras 104a-104n at the same time. Assume, for example, the image in FIG. 6 is the first image 106a and the image in FIG. 7 is the second image 106b from the same scene. In this example, the first and second images 106a, 106b are taken during an American football game and show a first player 600 and a second player 602.

Assume, for example, the candidate 3D location for a virtual camera (e.g., as identified by the virtual camera positioner 116) is behind the first player 600. The virtual camera location may be identified by X, Y, Z coordinates. The virtual camera projector 124 projects an object representative of a virtual camera into the first and second images 106a, 106b. For example, as shown in FIG. 6, the virtual camera projector 124 projects a virtual camera 606 into the first image 106a. Similarly, in FIG. 7, the virtual camera projector 124 projects the virtual camera 606 into the second image 106b of the virtual camera 606. The virtual camera projector 124 similarly projects the virtual camera 606 in each of the other images 106c-106n in which the virtual camera 606. In some instances, the 3D location of the virtual camera may not be in the view of a camera.

The virtual camera projector 124 also computes a virtual camera boundary box around the virtual camera 606 in each of the images in which the virtual camera 606 appears. The virtual camera boundary box is a 2D box that encompasses the virtual camera 606 in an image. The virtual camera boundary box may be defined by a set of pixel coordinates in the respective image that define the boundaries of the virtual camera box (e.g., top left corner (X1, Y1), top right corner (X2, Y2), bottom left corner (X3, Y3), bottom right corner (X4, Y4)). For example, as shown in FIG. 6, the virtual camera projector 124 computes a first virtual camera boundary box 608 around the virtual camera 606 in the first image 106a. Similarly, as shown in FIG. 7, the virtual camera projector 124 computes a second virtual camera boundary 700 around the virtual camera 606 in the second image 106b. The virtual camera projector 124 similarly computes a virtual camera boundary box around the virtual camera in each of the other images 106c-106n in which the virtual camera 606 appears. The virtual camera projector 124 can save the first set of images 106a-106n with the projected virtual camera and/or virtual camera boundary box information (e.g., the 2D coordinates of the virtual camera boundary box for an image) in the database 112.

While in this example the virtual camera 606 is represented as a 3D object shaped as a camera, in other examples, the virtual camera 606 can be represented by any other shaped object (e.g., a cube, a cylinder, etc.). Further, in other examples, the virtual camera can be represented by any sized object. In other examples, the virtual camera may be represented by a surface, a portion of a surface, a portion of a plane, or even a single coordinate (X, Y, Z coordinate) occurring in 3D space. In some examples, the virtual camera projector 124 may not project an image of the virtual camera into the images. Instead, the virtual camera projector 124 computes a virtual camera boundary box in the images 106a-106n based on the known 3D location of the virtual camera, without projecting an image of the virtual camera into the images.

Referring back to FIG. 1, the collision detector 122 includes an object detector 126. The object detector 126 detects objects, such players, balls, obstacles, and/or other objects, in each of the images 106a-106n and computes an object boundary box around each of the objects identified in the respective images 106a-106n. The object boundary boxes are 2D boxes that encompass the respective objects in the images. An object boundary box in an image may be defined by a set of pixel coordinates in the respective image that define the object boundary box (e.g., top left corner (X1, Y1), top right corner (X2, Y2), bottom left corner (X3, Y3), bottom right corner (X4, Y4)). In some examples, the object detector 126 uses a camera calibration matrix (based on multiple views from the various cameras 104a-104n) to detect objects in each of the images 106a-106n and compute the object boundary boxes for the respective objects. In some examples, the object detector 126 uses a deep learning based object detection algorithm, such as you-only-look-once (YOLO) or single shot multibox detector (SSD), to compute the boundary boxes. Example techniques that may be implemented by the object detector 126 for detecting objects (e.g., a player, a ball, etc.) in an image and/or defining boundary boxes are disclosed in International Application No. PCT/CN2018/108189, titled "Multi-Cam Ball Location Method and Apparatus," filed on Sep. 28, 2018, and International Application No. PCT/CN2018/107498, titled "Real-Time Multi-View Detection of Objects in Multi-Camera Environments," filed on Sep. 26, 2018, both of which are hereby incorporated by reference in their entireties. In some examples, the virtual camera projector 124 uses the reverse of one or more of these techniques to project the virtual camera (e.g., represented by an image of a camera, by a cube, by a cylinder, etc.) into the images.

Figure 8:
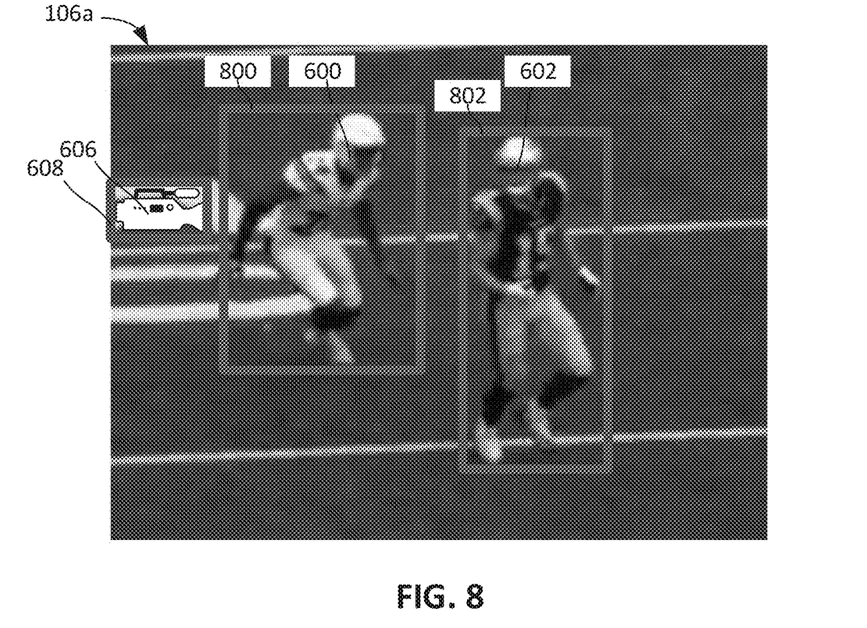
FIG. 8 is the first example image of FIG. 6 showing example object boundary boxes defined by the example virtual camera generator of FIG. 1 during a collision detection process.

FIG. 8 shows the first image 106a from FIG. 6. As shown in FIG. 8, the object detector 126 detects the first player 600 in the first image 106a and computes a first object boundary box 800 around the first player 600. Similarly, the object detector 126 detects the second player 602 and computes a second object boundary box 802 around the second player 602. If other objects were viewable in the first image 106a, the object detector 126 would similarly detect those objects and compute object boundary boxes around the objects.

Figure 9:
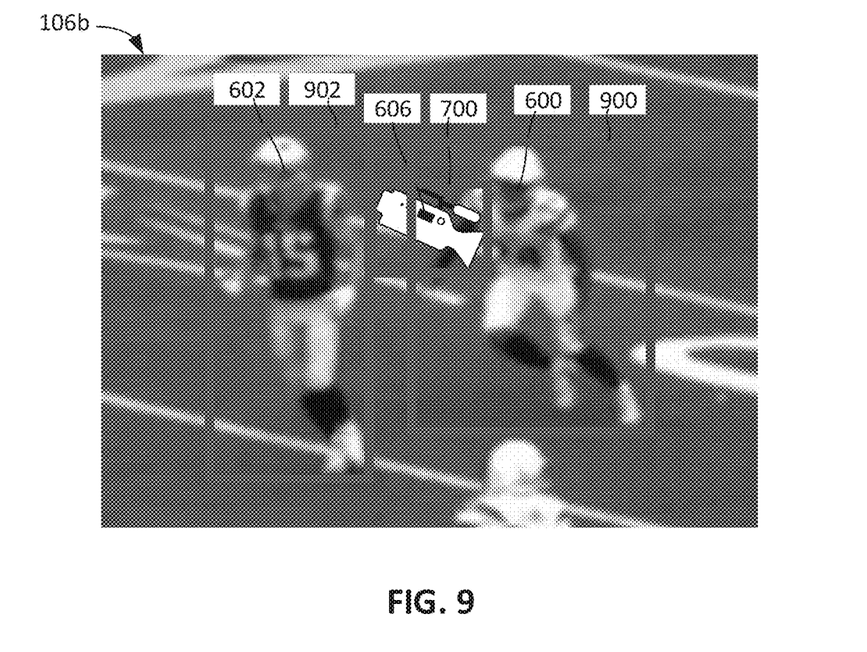
FIG. 9 is the second example image of FIG. 7 showing example object boundary boxes defined by the example virtual camera generator of FIG. 1 during a collision detection process.

Similarly, as shown in FIG. 9, which is the second image 106b from FIG. 7, the object detector 126 detects the first player 600 and the second player 602 and computes respective first and second object boundary boxes 900, 902 around the objects. As can been seen, the first and second players 600, 602 have differently sized boundary boxes between the first and second images 106a, 106b because of the different angles of the cameras. The object detector 126 similarly detects one or more object(s) in the other images 106c-106n and computes object boundary boxes around the object(s). In some examples, the object detector 126 only detects object(s) in the images in which the virtual camera 606 appears. The object detector 126 can save information associated with the detected objects and/or the object boundary box information (e.g., the 2D coordinates for each object boundary box) with the corresponding images in the database 112.

Referring back to FIG. 1, the collision detector 122 includes an overlap detector 128. The overlap detector 128 determines, for each of the images 106a-106n in which the virtual camera appears, whether there is an overlap between the virtual camera and one or more objects in the respective images 106a-106n. In some examples, the overlap detector 128 detects an overlap based on the virtual camera boundary box and the object boundary boxes in the respective images. The overlap detector 128 may compare the pixel coordinates that define the virtual camera boundary box and to the pixel coordinates that define the object boundary boxes in an image to determine whether an overlap exists. For example, in the first image 106a in FIG. 8, there is no overlap between the virtual camera boundary box 608 and either of the first or second boundary boxes 800, 802. As such, the overlap detector 128 determines there is no overlap in the first image 106a. However, in the second image 106b, as shown in FIG. 9, there is an overlap between the virtual camera boundary box 700 and the first object boundary box 900. As such, the overlap detector 128 detects there is an overlap occurring in the first image 106ba. The overlap detector 128 similarly analyzes each of the other images 106c-106n to determine whether an overlap occurs between the virtual camera boundary box and at least one object boundary box in the respective image. Because the cameras 104a-104n are disposed at various locations, angles, heights, etc. around the playing field, in some of the images 106a-106n there may be an overlap, while in other ones of the images 106a-106n there may not be an overlap. The overlap detector 128 counts or determines the number of the images 106a-106n having an overlap.

Referring back to FIG. 1, the collision detector 122 determines whether there is a collision based on the number of images having an overlap. In particular, in the illustrated example, the collision detector 122 includes a comparator

130. The comparator 130 compares the number of images with overlaps to a threshold. If the number of images with overlaps satisfies the threshold (e.g., meets or exceeds the threshold), the comparator 130 determines a collision occurs. If the number of images with overlaps does not satisfy the threshold (e.g., is below the threshold), the comparator 130 determines a collision does not occur. The threshold may be any number. For example, the threshold may be one (1). In such an instance, if at least one of the images 106a-106n is identified as having an overlap, the comparator 130 determines the candidate 3D location for the virtual camera 606 results in a collision. However, if none of the images 106a-106n of the scene have overlaps, then the collision detector 126 determines no collision occurs. As another example, the threshold may be two (2). In such an instance, if at least two of the images 106a-106n have overlaps, the collision detector 128 determines a collision occurs. However, if only one of the images 106a-106n has an overlap and the rest do not, the collision detector 128 determines no collision occurs. In other examples, the threshold may be another number, such as 3, 4, 5, etc. In some examples, the threshold is set by a user. The threshold may be lower, for example, if the user desires to be more cautious in avoiding a collision. In other examples, the threshold is based on one or more factors. For example, the threshold may be based on the total number of cameras and/or the number of cameras that view the area in which the virtual camera is located. In other examples, other factors may be used. In some examples, the comparator 130 automatically selects the threshold based on the one or more factors. For example, the comparator 130 may select a lower threshold if the total number of cameras and/or the number of cameras viewing the area of the playing field where the camera is to be disposed is relatively low, whereas the comparator 130 may select a higher threshold if the total number of cameras and/or the number of cameras viewing the area is relatively high.

If the collision detector 122 determines that no collision occurs, the view generator 118 outputs an image of the scene from the point-of-view of the virtual camera, which may be displayed on the display 120. However, if the collision detector 128 detects a collision, the virtual camera positioner 116 can take one or more different actions. In some examples, if a collision is detected in a scene, the virtual camera positioner 116 generates an alert or message, which may be output to the display 120, for example. The alert or message may indicate to the user to select a new 3D location for the virtual camera. Once the user selects a new 3D location, the example collision detecting process can begin again and the new 3D location is checked for a possible collision, thereby avoiding displaying a view from a scene where a collision occurs.

Additionally or alternatively, if a collision is detected, the virtual camera positioner 116 can automatically select a new candidate 3D location for the virtual camera. For example, the virtual camera may be tracking a player at a set distance behind the player. If a collision is detected in a scene, the virtual camera positioner 116 selects a new 3D location for the virtual camera that is one unit (e.g., a foot, a meter, etc.) to the left or right of the current position. In some examples, one or more rules for selecting new 3D locations may be set by a user (e.g., if a collision is detected, select a new 3D location that is one unit in the +X direction, select a new 3D location that is one unit in the −X direction, select a new 3D location that is one unit in the +Y direction, etc.). After a new virtual camera location is selected, the example collision detection process begins again to check the new 3D location.

If no collision is detected, the scene may be rendered. However, if another collision is detected, the example process repeats. Thus, the example virtual camera generator 102 can continue to check candidate locations until no collision is detected.

In some examples, a plurality of scenes may be created and rendered to create a video segment. The video segment may be any length of time. For example, a five second play may contain 150 scenes (if images are taken at 30 Hz). The 3D model creator 114 creates a 3D volumetric model for each of the scenes, and the collision detector 122 tests a target virtual camera location for each of the scenes. If a collision is detected in any of the scenes, the virtual camera positioner 116 may generate an alert and/or select a new 3D location for that scene, which can then be checked again. The virtual camera generate 102 may continue selecting and testing different locations until no collisions occur. Once no collisions occur, the view generator 118 generates the images for the video segment from the view point of the virtual camera. The video segment is output to the display 120.

The example virtual camera generator 102 can also provide real-time (or near real time) views of a scene from a virtual camera while an event is occurring. For example, as a player in a soccer game is running towards a goal with the ball, the virtual camera generator 102 can process the image information and output images from the virtual camera perspective (e.g., right behind the player) in near real time, as only delayed by the processing speed of the virtual camera generator 102. The virtual camera 102 may continually check for a possible collision and automatically adjust the location of the virtual camera, which is not possible for a human user to perform in real time. This improves user experience as the virtual camera location can be adjusted in real time to avoid voxels of other players.

While an example manner of implementing the example virtual camera generator 102 is illustrated in FIG. 1, one or more of the elements, processes and/or devices illustrated in FIG. 1 may be combined, divided, re-arranged, omitted, eliminated and/or implemented in any other way. Further, the example image receiver 110, the example 3D model creator 114, the example virtual camera positioner 116, the example view generator 118, the example collision detector 122, including the example virtual camera projector 124, the example objector detector 126, the example overlap detector 128, and the example comparator 130, and/or, more generally, the example virtual camera generator 102 of FIG. 1 may be implemented by hardware, software, firmware and/or any combination of hardware, software and/or firmware. Thus, for example, any of the example image receiver 110, the example 3D model creator 114, the example virtual camera positioner 116, the example view generator 118, the example collision detector 122, including the example virtual camera projector 124, the example objector detector 126, the example overlap detector 128, and the example comparator 130 and/or, more generally, the example virtual camera generator 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image receiver 110, the example 3D model creator 114, the example virtual camera positioner 116, the example view generator 118, the example collision detector 122, the example virtual camera projector 124, the example objector detector 126, the example overlap detector 128, and/or the example comparator 130 is/are hereby expressly defined to include a non-transitory computer readable storage device or storage disk such as a memory, a digital versatile disk (DVD), a compact disk (CD), a Blu-ray disk, etc. including the software and/or firmware. Further still, the example virtual camera generator of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
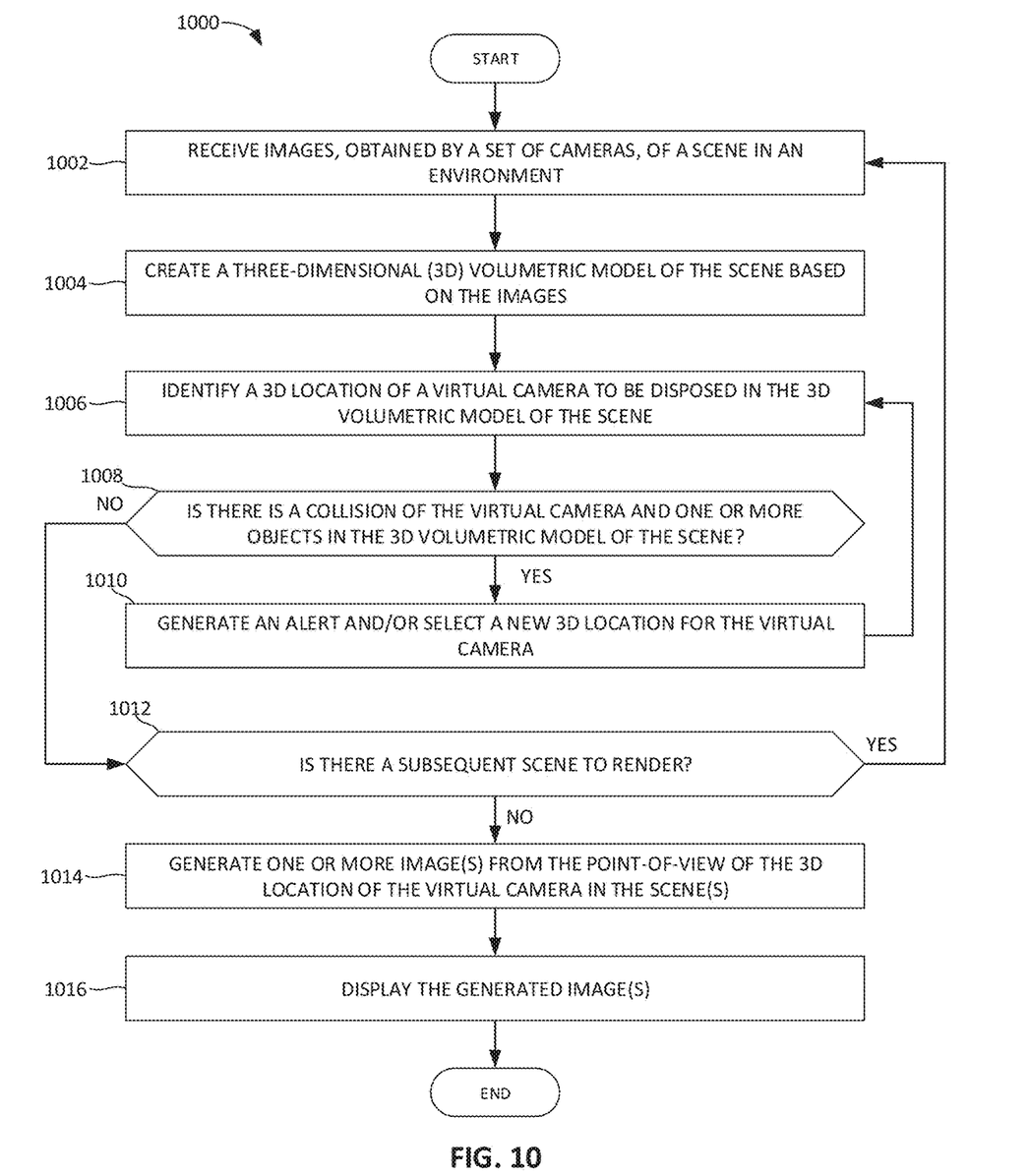
FIG. 10 is a flowchart of example machine readable instructions that may be executed to implement the example virtual camera generator of FIG. 1.
Figure 11:
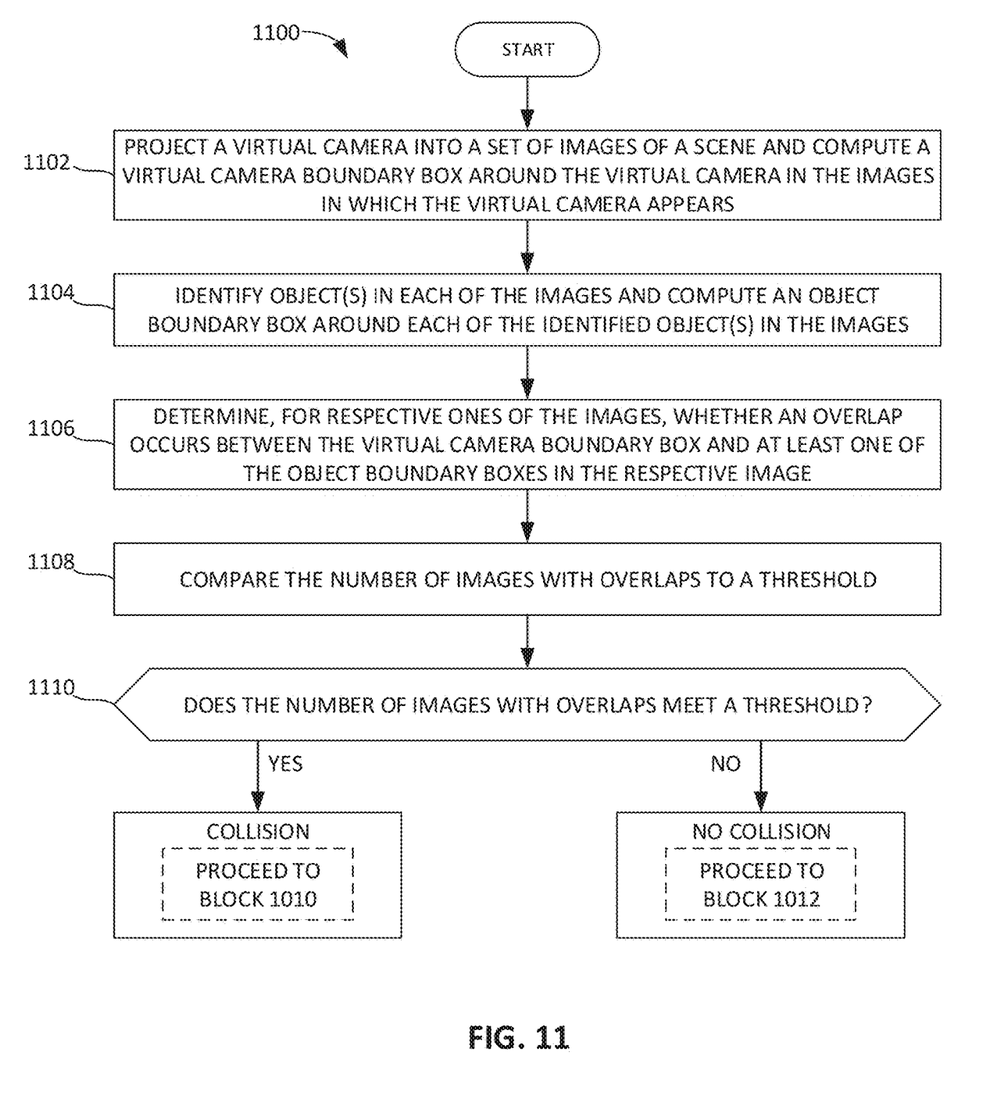
FIG. 11 is a flowchart of example machine readable instructions that may be executed to implement an example collision detector of the example virtual camera generator of FIG. 1.

Flowcharts representative of example hardware logic, machine readable instructions, hardware implemented state machines, and/or any combination thereof for implementing the virtual camera generator 102 and the collision detector 122 of FIG. 1 are shown in FIGS. 10 and 11, respectively. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowchart illustrated in FIGS. 10 and 11, many other methods of implementing the example virtual camera generator 102 and/or the collision detector 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 10 is a flowchart of example machine readable instructions 1000 that may be executed to implement the example virtual camera generator 102 of FIG. 1. At block 1002, the image receiver 110 receives a set of images, such as the first set of images 106a-106n, from the cameras 104a-104n of a scene in an environment. Therefore, in this example, the cameras 104a-104n provides means for obtaining a set of images of a scene in an environment. The environment may be any type of environment, such as a sports game. The image receiver 110 saves the first set of images 106a-106n in the database 112. In some examples, each of the images of the first set of images 106a-106n is timestamped.

At block 1004, the 3D model creator 114 creates a 3D volumetric model (e.g., a point cloud) of the scene based on the images 106a-106n. At block 1006, the virtual camera positioner 116 identifies a candidate 3D location (X, Y, Z) of a virtual camera to be disposed in the 3D volumetric model of the scene. In some examples, the candidate 3D location of the virtual is selected by a user. In other examples, the candidate 3D location is selected via a predetermined route. Example techniques that may be implemented by the virtual camera positioner 116 for selecting and/or identifying a candidate 3D location are disclosed in International Application No. PCT/CN2018/108375, titled "Automated Generation of Camera Paths," filed on Sep. 28, 2018, and International Application No. PCT/CN2018/107832, titled "Method and Apparatus of Identifying Freeze Moment for Volumetric Content Creation," filed on Sep. 27, 2018, both of which are hereby incorporated by reference in their entireties.

At block 1008, the collision detector 122 determines if there is a collision of the virtual camera and one or more objects in the 3D volumetric model of the scene. An example collision detection process that may be implemented at block 1008 is disclosed in connection with the flowchart in FIG. 11.

If the collision detector 122 detects a collision (at block 1008), the virtual camera positioner 116, at block 1010, generates an alert and/or selects a new candidate 3D location for the virtual camera. In some examples, by generating an alert, the user/director can select a new 3D location. In other examples, the virtual camera positioner 116 may automatically select a different 3D location. After a new 3D location is identified, control returns to block 1006, and the example process at blocks 1006 and 1008 repeats.

If the collision detector 122 does not detect a collision (at block 1008), the 3D model creator 114, at block 1012, determines if there is another scene to render. For example, if there are additional (e.g., subsequent) scenes to render, control returns to block 1002 and the set of images from the next scene are received and tested for a collision.

If there are no other scenes to render, control proceeds to block 1014. At block 1014, the view generator 118 generates images from the point-of-view of the 3D location of the virtual camera in each of the scenes. At block 1016, the generated image(s) of the scene(s) are displayed on the display 120. Therefore, in some examples, the display 120 provides means for displaying. In other examples, the virtual camera generator 102 may generate and display each view form a scene after checking for a collision.

In some examples, only one image of a scene is generated and displayed. In other examples, a video segment containing multiple images from sequential scenes is generated and displayed. This may occur in real time as an event is occurring, or may be stored and replayed. The video segment may be displayed at the same frequency the original images were taken (e.g., 30 Hz). In other examples, the video segment may be displayed at a faster or slower rate. In some examples, the image(s) and/or video segment are broadcast to other devices (e.g., household televisions, smart phones, etc.). For example, after a goal is scored in a soccer game occurs, a user may replay the last few seconds of the goal from a virtual camera location that follows the player who scored the goal.

FIG. 11 is a flowchart of example machine readable instructions 1100 that may be executed to implement the collision detector 122. The example process of FIG. 11 may be implemented at block 1008 of FIG. 10. The process of FIG. 11 is described in connection with the first set of images 106a-106n. However, it is understood that the process of FIG. 11 can be similarly performed in connection with any other set of images corresponding to another scene.

At block 1102, the virtual camera projector 124 projects the virtual camera into the images 106a-106n where the virtual camera can be seen. For example, because the candidate 3D location of the virtual camera is known (see block 1006 (FIG. 10), and the locations and angles of the cameras 104-104n are known (and, thus, the relative location of the candidate 3D location to each of the cameras 104a-104n is known), the virtual camera projector 124 can project the virtual camera into the images 106a-106n where the virtual camera would be seen. The virtual camera projector 124 also computes a virtual camera boundary box around the virtual camera in the images 106a-106n in which the virtual camera appears. For example, in FIGS. 6 and 7, the virtual camera 606 is projected into the first and second images 106a, 106b and the virtual camera boundary boxes 608, 70 are created around the virtual camera 606. The virtual camera projector 124 may save the virtual camera bound box information (e.g., the pixel coordinates) with the associated image in the database 112.

At block 1104, the object detector 126 detects or identifies any objects in the images 106a-106n and computes an object boundary box around each of the objects in the images 106a-106n. The object(s) may include, for example, players, sports implements (e.g., a ball, a puck, a racquet, a hockey stick, a golf club, etc.), obstacles, and/or any other object in the field-of-view. In some examples, the object detector 126 only objects in the images 106a-106n in which the virtual camera appears. Example techniques that may be implemented by the object detector 126 for detecting objects in an image and computing boundary boxes are disclosed in International Application No. PCT/CN2018/108189, titled "Multi-Cam Ball Location Method and Apparatus," filed on Sep. 28, 2018, and International Application No. PCT/CN2018/107498, titled "Real-Time Multi-View Detection of Objects in Multi-Camera Environments," filed on Sep. 26, 2018, both of which are hereby incorporated by reference in their entireties. The object detector 126 may save detected object information and/or the object boundary box information (e.g., the pixel coordinates) for each of the images in the database 112.

At block 1106, the overlap detector 128, determines, for respective ones of the images 106a-106n, whether an overlap occurs between the virtual camera boundary box and at least of the object boundary boxes in the respective image. For example, FIG. 8 shows an example where no overlap occurs, and FIG. 9 show examples where an overlap occurs. In some examples, the overlap detector 128 detects an overlap by comparing, for an image, the pixel coordinates that define the virtual camera boundary box and the pixel coordinates that define the one or more object boundary boxes. The overlap detector 128 determines the number of images with overlaps.

At block 1108, the comparator 130 compares the number of images with overlaps to a threshold. In some examples, the threshold is two (2). In other examples, the threshold may be any other number (e.g., 1, 3, 4, etc.). In some examples, the threshold is set by a user. In other examples, one or more factors may be used to determine the threshold.

At block 1110, the comparator 130 determines whether the number of images with overlaps meets the threshold (e.g., exceeds the threshold, is equal to or exceeds the threshold). For example, if the threshold is two (2), and at least two of the images 106a-106n have overlaps, the threshold is met.

If the number of images with overlaps meets the threshold, comparator 130 determines there is a collision. As such, the view of the virtual camera may be obstructed and/or otherwise unsatisfactory for viewing from the candidate 3D location of the virtual camera. In such an instance, control may proceed to block 1010 of FIG. 10, where an alert is generated and/or a new location for the virtual camera is selected.

If the number of images with overlaps does not meet the threshold (e.g., is less than the threshold, is equal to or less than the threshold), the comparator 130 determines there is no collision. As such, the candidate location for the virtual camera is satisfactory. In such an instance, control may proceed to block 1012 of FIG. 10.

Figure 12:
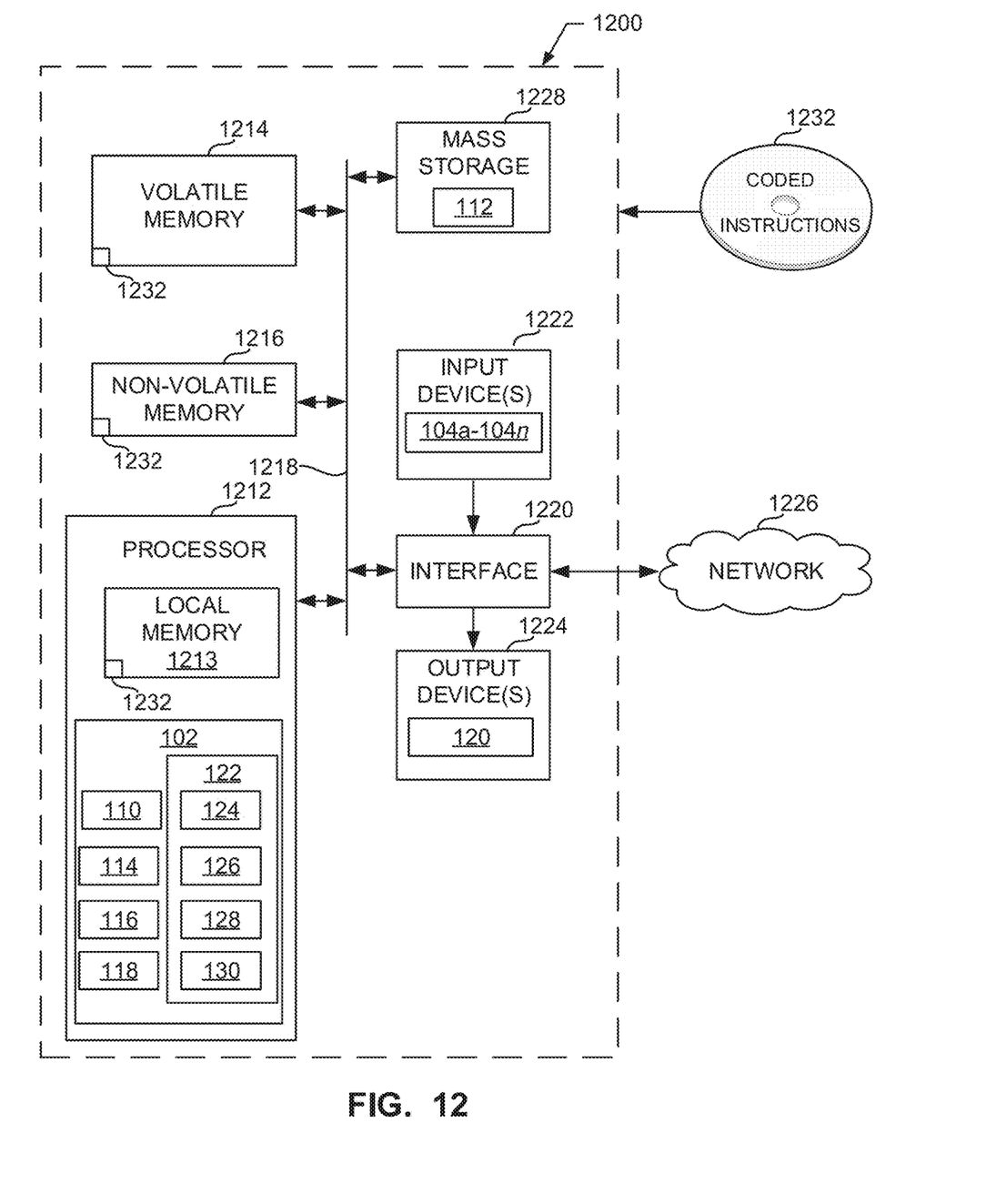
FIG. 12 is a block diagram of an example processing platform structured to execute the instructions of FIG. 10 and/or FIG. 11 to implement the example virtual camera generator and/or the example collision detector of FIG. 1.

FIG. 12 is a block diagram of an example processor platform 1200 structured to execute the instructions of FIGS. 10 and 11 to implement the virtual camera generator 102 and/or the collision detector 122 of FIG. 1. The processor platform 1200 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the image receiver 110, the 3D model creator 114, the virtual camera positioner 116, the view generator 118, the collision detector 122, including the virtual camera projector 124, the object detector 126, the overlap detector 128, and the comparator 130, and/or, more generally, the virtual camera generate 102. Therefore, in some examples, the processor 1212 provides means for processing.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a device and/or a user to enter data and/or commands into the processor 1212. In this example, the input device(s) 1222 include the camera(s) 104-104n. Additionally or alternatively, the input device(s) 1222 can be implemented by, for example, an audio sensor, a microphone, a keyboard, a button, a mouse, a touchscreen, a track-pad, a trackball, isopoint and/or a voice recognition system.

One or more output devices 1224 are also connected to the interface circuit 1220 of the illustrated example. The output device(s) 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), such as the display 120, a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 10 and 11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that detect a possible collision of a virtual camera with one or more objects in a 3D volumetric model. If a possible collision is detected, a new location for the virtual camera can be selected, without human intervention. This reduces operational costs if a non-optimal location is originally selected. As such, obstructed views from a virtual camera position are reduced or eliminated. As a result, better quality scenes are displayed, which enhances the experience for the audience.

Example methods, apparatus, systems, and articles of manufacture to detect a collision of virtual camera with objects in a 3D volumetric model are disclosed herein. Further examples and combinations thereof include the following:

Example 1 is a virtual camera system including cameras to obtain images of a scene in an environment and a virtual camera generator to: create a 3D volumetric model of the scene based on the images, identify a 3D location of a virtual camera to be disposed in the 3D volumetric model, and detect whether a collision occurs between the virtual camera and one or more objects in the 3D volumetric model.

Example 2 includes the virtual camera system of Example 1, wherein the virtual camera generator is to detect whether a collision occurs by: projecting the virtual camera into the images in which the 3D location of the virtual camera appears, determining, for respective ones of the images, whether an overlap occurs between the virtual camera and an object in the respective image, and comparing a number of the images with overlaps to a threshold.

Example 3 includes the virtual camera system of Example 2, wherein the virtual camera generator is to determine whether an overlap occurs by: computing a camera boundary box around the virtual camera in the images in which the virtual camera appears, computing an object boundary box around each object in the images in which the virtual camera appears, and determining whether there is an overlap between the camera boundary box and at least one of the object boundary boxes in the respective images.

Example 4 includes the virtual camera system of any of Examples 1-3, wherein the 3D location is a first 3D location, and wherein, if the virtual camera generator detects a collision, the virtual camera generator is to at least one of generate an alert or select a second 3D location for the virtual camera.

Example 5 includes the virtual camera system of any of Examples 1-4, further including a display, wherein, if the virtual camera generator does not detect a collision, the virtual camera generator is to: generate an image of the scene in the 3D volumetric model from the 3D location of the virtual camera, and cause the display to present the generated image of the scene.

Example 6 includes the virtual camera system of any of Examples 1-5, wherein the environment is a sports arena including a playing field, and the scene is a moment during a game occurring on the playing field.

Example 7 includes the virtual camera system of Example 6, wherein the cameras are disposed around the sports arena and directed at various locations of the playing field.

Example 8 is a non-transitory computer readable storage medium including instructions that, when executed, cause at least one processor to at least create a three-dimensional (3D) volumetric model of a scene in an environment based on a set of images of the scene, identify a 3D location of a virtual camera to be disposed in the 3D volumetric model, and detect whether a collision occurs between the virtual camera at the 3D location and one or more objects in the 3D volumetric model.

Example 9 includes the non-transitory computer readable storage medium of Example 8, wherein the instructions, when executed, cause the at least one processor to detect whether a collision occurs by: projecting the virtual camera into the images in which the 3D location of the virtual camera appears, determining, for respective ones of the images, whether an overlap occurs between the virtual camera and an object in the respective image, and comparing a number of the images with overlaps to a threshold.

Example 10 includes the non-transitory computer readable storage medium of Example 9, wherein the instructions, when executed, cause the at least processor to determine whether an overlap occurs by: computing a camera boundary box around the virtual camera in the images in which the virtual camera appears, computing an object boundary box around each object in the images in which the virtual camera appears, and determining whether there is an overlap between the camera boundary box and at least one of the object boundary boxes in the respective images.

Example 11 includes the non-transitory computer readable storage medium of any of Examples 8-10, wherein the 3D location is a first 3D location, and wherein, if a collision is detected, the instructions, when executed, cause the at least one processor to at least one of generate an alert or select a second 3D location for the virtual camera.

Example 12 includes the non-transitory computer readable storage medium of any of Examples 8-11, wherein, if a collision is not detected, the instructions, when executed, cause the at least one processor to: generate an image of the scene in the 3D volumetric model from the 3D location of the virtual camera, and cause a display to present the generated image of the scene.

Example 13 includes the non-transitory computer readable storage medium of any of Examples 8-12, wherein the environment is a sports arena including a playing field, and the scene is a moment during a game occurring on the playing field.

Example 14 includes the non-transitory computer readable storage medium of Example 13, wherein the set of images are obtained by a respective set of cameras disposed around the sports arena and directed at various locations of the playing field.

Example 15 is a method to improve viewing a scene in a three-dimensional (3D) volumetric model, the method including creating, by executing an instruction with at least one processor, a 3D volumetric model of a scene in an environment based on a set of images of the scene, identifying, by executing an instruction with the at least one processor, a 3D location of a virtual camera to be disposed in the 3D volumetric model, and detecting, by executing an instruction with the at least one processor, whether a collision occurs between the virtual camera at the 3D location and one or more objects in the 3D volumetric model.

Example 16 includes the method of Example 15, wherein the detecting of whether a collision occurs includes: projecting the virtual camera into the images in which the 3D location of the virtual camera appears, determining, for respective ones of the images, whether an overlap occurs between the virtual camera and an object in the respective image, and comparing a number of the images with overlaps to a threshold.

Example 17 includes the method of Example 16, wherein the determining of whether an overlap occurs includes: computing a camera boundary box around the virtual camera in the images in which the virtual camera appears, computing an object boundary box around each object in the images in which the virtual camera appears, and determining whether there is an overlap between the camera boundary box and at least one of the object boundary boxes in the respective images.

Example 18 includes the method of any of Examples 15-17, wherein the 3D location is a first 3D location, further including, if a collision is detected, at least one of generating an alert or selecting a second 3D location for the virtual camera.

Example 19 includes the method of any of Examples 15-18, further including, if a collision is not detected: generating, by executing an instruction with the at least one processor, an image of the scene in the 3D volumetric model from the 3D location of the virtual camera, and displaying the generated image of the scene.

Example 20 includes the method of any of Examples 15-19, wherein the environment is a sports arena including a playing field, and the scene is a moment during a game occurring on the playing field.

Example 21 includes the method of Example 20, further including obtaining the set of images from a respective set of cameras disposed around the sports arena and directed at various locations of the playing field.

Example 22 is an apparatus including means for obtaining a set of images of a scene in an environment and means for processing. The processing means is to: create a 3D volumetric model of the scene based on the images, identify a 3D location of a virtual camera to be disposed in the 3D volumetric model, and detect whether a collision occurs between the virtual camera and one or more objects in the 3D volumetric model.

Example 23 includes the apparatus of Example 22, wherein the processing means is to detect whether a collision occurs by: projecting the virtual camera into the images in which the 3D location of the virtual camera appears, determining, for respective ones of the images, whether an overlap occurs between the virtual camera and an object in the respective image, and comparing a number of the images with overlaps to a threshold.

Example 24 includes the apparatus of Example 23, wherein the processing means is to determine whether an overlap occurs by: computing a camera boundary box around the virtual camera in the images in which the virtual camera appears, computing an object boundary box around each object in the images in which the virtual camera appears, and determining whether there is an overlap between the camera boundary box and at least one of the object boundary boxes in the respective images.

Example 25 includes the apparatus of any of Examples 22-24, further including means for displaying, wherein the 3D location is a first 3D location, wherein, if the processing means detects a collision, the processing means is to at least one of generate an alert or select a second 3D location for the virtual camera, and wherein, if the processing means does not detect a collision, the processing means is to generate an image of the scene in the 3D volumetric model from the 3D location of the virtual camera, and the display means is to present the generated image of the scene.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A virtual camera system comprising:
   cameras to obtain images of a scene in an environment;
   memory;
   instructions in the virtual camera system; and
   processor circuitry to execute instructions to:
   create a 3D volumetric model of the scene based on the images;
   identify a 3D location of a virtual camera to be disposed in the 3D volumetric model; and
   detect whether a collision occurs between the virtual camera and one or more objects in the 3D volumetric model by:
   projecting the virtual camera into the images in which the 3D location of the virtual camera appears;
   determining, for respective ones of the images, whether an overlap occurs between the virtual camera and an object in the respective image; and
   comparing a number of the images with overlaps to a threshold.

2. The virtual camera system of claim 1, wherein the processor circuitry is to determine whether an overlap occurs by:
   computing a camera boundary box around the virtual camera in the images in which the virtual camera appears;
   computing an object boundary box around each object in the images in which the virtual camera appears; and
   determining whether there is an overlap between the camera boundary box and at least one of the object boundary boxes in the respective images.

3. The virtual camera system of claim 1, wherein the 3D location is a first 3D location, and wherein, if the processor circuitry detects a collision, the processor circuitry is to at least one of generate an alert or select a second 3D location for the virtual camera.

4. The virtual camera system of claim 1, further including a display, wherein, if the processor circuitry does not detect a collision, the processor circuitry is to:
   generate an image of the scene in the 3D volumetric model from the 3D location of the virtual camera; and
   cause the display to present the generated image of the scene.

5. The virtual camera system of claim 1, wherein the environment is a sports arena including a playing field, and the scene is a moment during a game occurring on the playing field.

6. The virtual camera system of claim 5, wherein the cameras are disposed around the sports arena and directed at various locations of the playing field.

7. A non-transitory computer readable storage medium comprising instructions that, when executed, cause at least one processor to at least:
   create a three-dimensional (3D) volumetric model of a scene in an environment based on a set of images of the scene;
   identify a 3D location of a virtual camera to be disposed in the 3D volumetric model; and
   detect whether a collision occurs between the virtual camera at the 3D location and one or more objects in the 3D volumetric model by:
   projecting the virtual camera into the images in which the 3D location of the virtual camera appears;
   determining, for respective ones of the images, whether an overlap occurs between the virtual camera and an object in the respective image; and
   comparing a number of the images with overlaps to a threshold.

8. The non-transitory computer readable storage medium of claim 7, wherein the instructions, when executed, cause the at least processor to determine whether an overlap occurs by:
   computing a camera boundary box around the virtual camera in the images in which the virtual camera appears;
   computing an object boundary box around each object in the images in which the virtual camera appears; and
   determining whether there is an overlap between the camera boundary box and at least one of the object boundary boxes in the respective images.

9. The non-transitory computer readable storage medium of claim 7, wherein the 3D location is a first 3D location, and wherein, if a collision is detected, the instructions, when executed, cause the at least one processor to at least one of generate an alert or select a second 3D location for the virtual camera.

10. The non-transitory computer readable storage medium of claim 7, wherein, if a collision is not detected, the instructions, when executed, cause the at least one processor to:
    generate an image of the scene in the 3D volumetric model from the 3D location of the virtual camera; and
    cause a display to present the generated image of the scene.

11. The non-transitory computer readable storage medium of claim 7, wherein the environment is a sports arena including a playing field, and the scene is a moment during a game occurring on the playing field.

12. The non-transitory computer readable storage medium of claim 11, wherein the set of images are obtained by a respective set of cameras disposed around the sports arena and directed at various locations of the playing field.

13. A method to improve viewing a scene in a three-dimensional (3D) volumetric model, the method comprising:
    creating, by executing an instruction with at least one processor, a 3D volumetric model of a scene in an environment based on a set of images of the scene;
    identifying, by executing an instruction with the at least one processor, a 3D location of a virtual camera to be disposed in the 3D volumetric model; and
    detecting, by executing an instruction with the at least one processor, whether a collision occurs between the virtual camera at the 3D location and one or more objects in the 3D volumetric model by:
    projecting the virtual camera into the images in which the 3D location of the virtual camera appears;

determining, for respective ones of the images, whether an overlap occurs between the virtual camera and an object in the respective image; and comparing a number of the images with overlaps to a threshold.

14. The method of claim 13, wherein the determining of whether an overlap occurs includes:

computing a camera boundary box around the virtual camera in the images in which the virtual camera appears;

computing an object boundary box around each object in the images in which the virtual camera appears; and determining whether there is an overlap between the camera boundary box and at least one of the object boundary boxes in the respective images.

15. The method of claim 13, wherein the 3D location is a first 3D location, further including, if a collision is detected, at least one of generating an alert or selecting a second 3D location for the virtual camera.

16. The method of claim 13, further including, if a collision is not detected:

generating, by executing an instruction with the at least one processor, an image of the scene in the 3D volumetric model from the 3D location of the virtual camera; and displaying the generated image of the scene.

17. The method of claim 13, wherein the environment is a sports arena including a playing field, and the scene is a moment during a game occurring on the playing field.

18. The method of claim 17, further including obtaining the set of images from a respective set of cameras disposed around the sports arena and directed at various locations of the playing field.

19. An apparatus comprising:

means for obtaining a set of images of a scene in an environment; and means for processing, the processing means to:

create a 3D volumetric model of the scene based on the images;

identify a 3D location of a virtual camera to be disposed in the 3D volumetric model; and detect whether a collision occurs between the virtual camera and one or more objects in the 3D volumetric model by:

projecting the virtual camera into the images in which the 3D location of the virtual camera appears;

determining, for respective ones of the images, whether an overlap occurs between the virtual camera and an object in the respective image; and comparing a number of the images with overlaps to a threshold.

20. The apparatus of claim 19, wherein the processing means is to determine whether an overlap occurs by:

computing a camera boundary box around the virtual camera in the images in which the virtual camera appears;

computing an object boundary box around each object in the images in which the virtual camera appears; and determining whether there is an overlap between the camera boundary box and at least one of the object boundary boxes in the respective images.

21. The apparatus of claim 19, further including means for displaying, wherein the 3D location is a first 3D location, wherein, if the processing means detects a collision, the processing means is to at least one of generate an alert or select a second 3D location for the virtual camera, and wherein, if the processing means does not detect a collision, the processing means is to generate an image of the scene in the 3D volumetric model from the 3D location of the virtual camera, and the display means is to present the generated image of the scene.

* * * * *